(12) United States Patent
Lee

(10) Patent No.: US 10,194,190 B2
(45) Date of Patent: Jan. 29, 2019

(54) ADAPTING USER INTERFACE OF DISPLAY APPARATUS ACCORDING TO REMOTE CONTROL DEVICE

(71) Applicant: SAMSUNG ELECTRONICS CO., LTD., Suwon-si (KR)

(72) Inventor: Seung-hwan Lee, Gwangmyeong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/336,998

(22) Filed: Oct. 28, 2016

(65) Prior Publication Data

US 2017/0127114 A1    May 4, 2017

(30) Foreign Application Priority Data

Oct. 28, 2015 (KR) .................. 10-2015-0150284

(51) Int. Cl.
| | |
|---|---|
| *H04N 5/44* | (2011.01) |
| *H04N 21/422* | (2011.01) |
| *H04N 21/431* | (2011.01) |
| *H04N 21/442* | (2011.01) |
| *H04N 21/45* | (2011.01) |
| *H04N 21/478* | (2011.01) |
| *H04N 21/482* | (2011.01) |
| *H04N 21/488* | (2011.01) |

(52) U.S. Cl.
CPC ... *H04N 21/42204* (2013.01); *H04N 21/4312* (2013.01); *H04N 21/44218* (2013.01); *H04N 21/4516* (2013.01); *H04N 21/4781* (2013.01); *H04N 21/482* (2013.01); *H04N 21/4882* (2013.01); *H04N 5/4403* (2013.01)

(58) Field of Classification Search
CPC .................................................. H04N 5/4403
See application file for complete search history.

(56) References Cited

U.S. PATENT DOCUMENTS

| 8,832,769 B2 | 9/2014 | Migos | |
|---|---|---|---|
| 2002/0059588 A1* | 5/2002 | Huber | G07C 9/00158 |
| | | | 725/35 |

(Continued)

FOREIGN PATENT DOCUMENTS

| KR | 10-2014-0036459 A | 3/2014 |
|---|---|---|
| KR | 10-2015-0041311 A | 4/2015 |

OTHER PUBLICATIONS

International Search Report, issued by International Searching Authority in corresponding International Application No. PCT/KR2016/012171, dated Feb. 14, 2017, (PCT/ISA/210).

(Continued)

*Primary Examiner* — Michael H Hong
(74) *Attorney, Agent, or Firm* — Sughrue Mion, PLLC

(57) ABSTRACT

A method of controlling a display apparatus is provided. According to the method, a display apparatus may receive data from a remote control device, identify the remote control device based on the received data, implement a function of the display apparatus in accordance with the received data, and display a user interface (UI) screen corresponding to the identified remote control device based on a user input being input through the remote control device.

19 Claims, 9 Drawing Sheets

(56) References Cited

U.S. PATENT DOCUMENTS

| | | | |
|---|---|---|---|
| 2005/0240965 A1* | 10/2005 | Watson | H04N 5/44543 725/45 |
| 2006/0209016 A1* | 9/2006 | Fox | G06F 3/038 345/156 |
| 2007/0240182 A1 | 10/2007 | Callahan | |
| 2009/0138907 A1* | 5/2009 | Wiser | H04N 5/4403 725/34 |
| 2011/0134320 A1 | 6/2011 | Daly | |
| 2012/0147270 A1 | 6/2012 | Kim et al. | |
| 2014/0082659 A1* | 3/2014 | Fife | H04N 21/25891 725/32 |
| 2014/0145951 A1* | 5/2014 | Hung | G06F 3/0304 345/158 |
| 2015/0121306 A1 | 4/2015 | Fundament et al. | |
| 2015/0123893 A1 | 5/2015 | Lee et al. | |
| 2015/0179061 A1 | 6/2015 | Kim et al. | |
| 2015/0296273 A1* | 10/2015 | Kim | H04N 21/8173 725/32 |
| 2016/0330078 A1* | 11/2016 | Bostick | H04W 4/21 |

OTHER PUBLICATIONS

Communication dated Feb. 8, 2018, issued by the European Patent Office in counterpart European application No. 16860245.6.

Anonymous, "Handling TV Hardware | Android Developers", Jan. 31, 2014, XP055445894, Retrieved from the Internet: Developer.android.com, 10 pages total URL: https://developer.android.com/training/tv/start/hardware.htm [retrieved on Jan. 30, 2018].

Anonymous, "Amazon Fire TV User Guide", Oct. 12, 2015, Retrieved from the Internet, XP055445620, 97 pages total URL: http://developer.android/training/game-controllers/controller-input.html [retrieved on Jan. 30, 2018].

Communication dated Sep. 26, 2018, issued by the European Patent Office in counterpart European Patent Application No. 16860245.6.

* cited by examiner

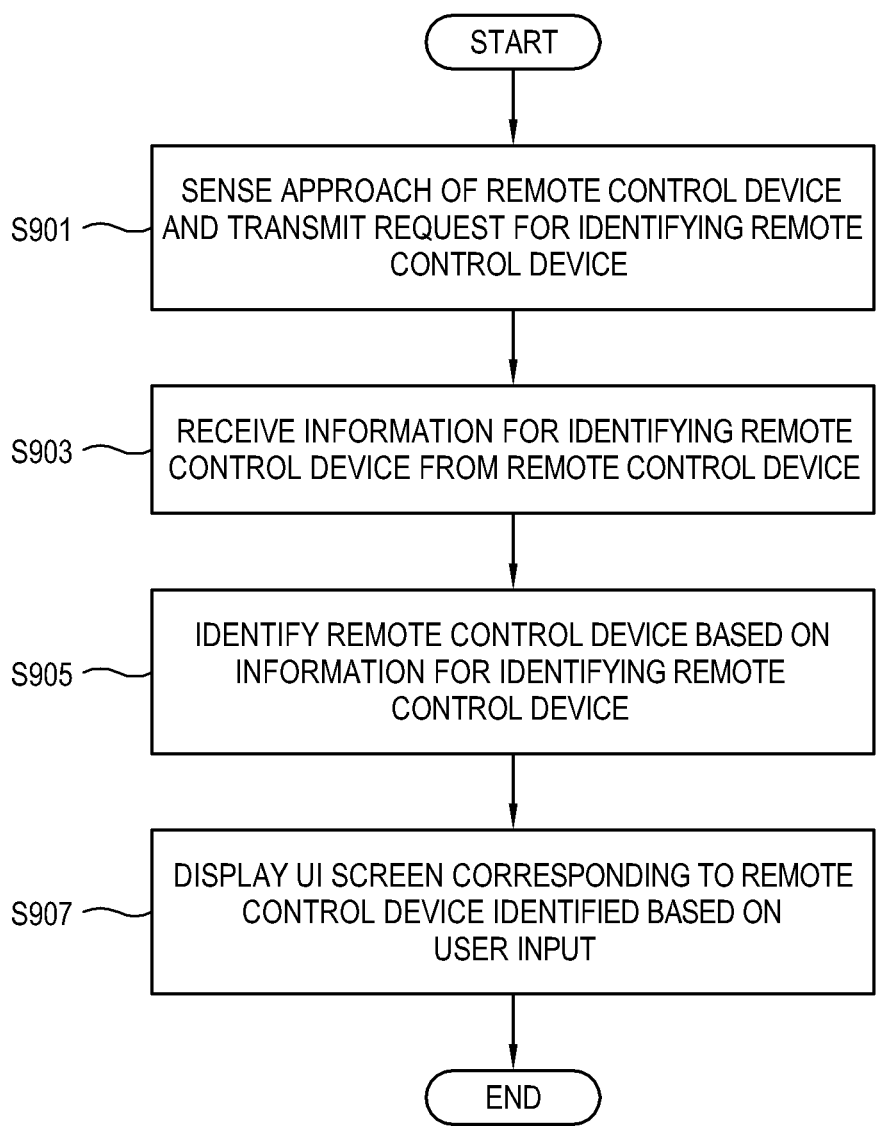

ADAPTING USER INTERFACE OF DISPLAY APPARATUS ACCORDING TO REMOTE CONTROL DEVICE

CROSS-REFERENCE TO RELATED APPLICATION

This application claims priority from Korean Patent Application No. 10-2015-0150284, filed on Oct. 28, 2015 in the Korean Intellectual Property Office, the disclosure of which is incorporated herein by reference.

BACKGROUND

1. Field

Apparatuses and methods consistent with exemplary embodiments relate to a display apparatus and a display control method thereof, and more particularly to a method of displaying a user interface (UI) corresponding to various controllers (e.g., a remote control) capable of controlling a display apparatus.

2. Description of Related Art

Developments in semiconductor and wireless communication technologies have enabled users to perform multiple tasks simultaneously on a television set, such as browsing a website, executing an application, and watching a television program. For example, a user may execute an application (app) and play a video game at the same time on a single television set. In accordance with various functions of the TV, there have been proposed various types of remote controllers as input devices for allowing a user to control the TV remotely. For example, a user can now use not only a conventional infrared (IR) remote controller but also a smart phone, a game controller, etc. to control the TV. In particular, if a user executes an app and plays a video game in the TV, a remote control device dedicated for video games may be needed for various control requirements because of the limitations of the conventional IR remote controls. Accordingly, if a user were to execute an app to play a video game or perform other specialized functions in the TV, the user must often select among multiple remote control devices to obtain the intended results.

If a user tries to execute a certain app among various apps available on the display apparatus, the user has to first ensure that the app is compatible with a remote control device that the user intends to use, and then execute the app that supports the remote control device. This may be inconvenient and ineffective for the user because the user has to remember which apps are compatible with which remote control devices that she owns.

SUMMARY

One or more exemplary embodiments provide a device and a method for adapting a user interface of a display apparatus according to a remote control device.

One or more exemplary embodiments provide a display apparatus that can identify what remote control device is currently in use by a user, and recommend to the user a list of content items that support the identified remote control device.

According to an aspect of an exemplary embodiment, there is provided a method of controlling a display apparatus. The method includes receiving data from a remote control device, identifying the remote control device based on the received data, implementing a function of the display apparatus in accordance with the received data, and displaying on a screen of the display apparatus a user interface (UI) corresponding to the remote control device based on a user input provided through the remote control device. Here, the user input may be a command for listing available. The data may be a command for controlling a screen display of the display apparatus. The data may be a command for controlling a volume level of the display apparatus.

The identifying the remote control device may include implementing a function of the display apparatus corresponding to a key value of the received data, and identifying the remote control device based on the implemented function. The identifying the remote control device may include identifying a communication protocol of the received data, and identifying the remote control device based on the identified protocol. The UI may show a list of content items controllable by the identified remote control device. In the UI, the content controllable by the identified remote control device may be displayed to be visually distinguishable from other content not controllable by the identified remote control device. The data may include ID information of the remote control device.

The UI may include a plurality of content items, and the displaying the UI may include displaying one or more content items corresponding to the identified remote control device among the plurality of content items to be distinguished from remaining content items in the plurality of content items. Here, the displaying one or more content items corresponding to the identified remote control device to be distinguished from the other content may include grouping the one or more content items into a category to be distinguished from the other content, displaying the one or more content items to be highlighted or changed in color or size, or adding a predefined graphical object to the one or more content items.

The displaying the UI may include displaying an icon corresponding to a content item of the list of content items to be different, from other icons, in size in accordance with a frequency with which the content item is selected by a user, based on a usage history of the display apparatus.

The method may further include receiving a user command for executing a selected content item included in the UI, and displaying a message, indicating one or more remote control devices capable of controlling the content item, on a screen of the display apparatus in response to a determination that the selected content item is not controllable by the identified remote control device.

According to an aspect of another exemplary embodiment, there is provided a method of controlling a display apparatus. The method may include sensing a remote control device located within a threshold distance from the display apparatus, in response to the sensing the remote control device, sending a request for identification information of the remote control device, receiving the identification information from the remote control device, identifying the remote control device based on the identification information received, and displaying a user interface (UI) corresponding to the remote control device based on a user input.

According to an aspect of still another exemplary embodiment, there is provided a display, a communicator configured to receive data from a remote control device, and a controller configured to identify the remote control device based on the received data and control the display to display a user interface (UI) corresponding to the remote control device on the display.

The controller may be configured to implement a function corresponding to a key value of the received data and identify the remote control device based on the implemented function. The controller may be further configured to identify the communication protocol of the received data, and identify the remote control device based on the identified protocol. The UI screen may show a list of content controllable by the identified remote control device.

The UI screen may include a plurality of content items, and the controller may control one or more content items corresponding to the identified remote control device among the plurality of content items to be visually distinguished from the other content. The controller may group the one or more content items into a category to be distinguished from the other content, and display the one or more content items to be highlighted or changed in color or size, or adding a preset graphic object to the one or more content items.

The controller may control icons displayed corresponding to the content to be different in size in accordance with frequency that the content is selected, based on a use history of the display apparatus.

In the UI screen, the content controllable by the identified remote control device may be displayed to be visually distinguishable. The data may include ID information of the remote control device. The controller may receive a user command for executing content selected by a user, and control the display to display a first message on a screen if it is determined that the selected content is not controllable by the identified remote control device. The first message may involve names of remote control devices capable of controlling the content.

According to an aspect of yet another exemplary embodiment, there is provided a display apparatus including a display configured to display a UI screen; a sensing portion configured to sense an approach of the remote control device; and a controller configured to identify the remote control device based on the sensing results, and control the display to display the UI screen corresponding to the identified remote control device.

According to an aspect of yet another exemplary embodiment, there is provided a display control method of a display apparatus, the method including receiving data from a remote control device; implementing a function of the display apparatus in accordance with the received data; automatically identifying the remote control device based on the received data; and displaying a user interface (UI) screen corresponding to the identified remote control device if a command is issued to enter a content list mode.

The identifying the remote control device may include identifying the remote control device based on the implemented function. The received data may include one of remote controller code format different according to the remote control device and a commercial remote controller code format used in common by the remote control devices. The data may include a command for moving a cursor displayed on a screen of the display apparatus.

The identifying the remote control device may include identifying a communication protocol of the received data, and identifying the remote control device based on the identified protocol.

The UI screen may show a list of content controllable by the identified remote control device. The UI screen may show a list of content optimized for the identified remote control device. The UI screen may include a plurality of pieces of content, and the displaying the UI screen includes displaying one or more pieces of the content corresponding to the identified remote control device among the plurality of pieces of the content to be distinguished from the other content.

The displaying one or more pieces of the content corresponding to the identified remote control device to be distinguished from the other content may include grouping the one or more pieces of the content into a category to be distinguished from the other content.

The displaying one or more pieces of the content corresponding to the identified remote control device to be distinguished from the other content may include adding a preset graphic object to the one or more pieces of the content. The displaying the UI screen may include displaying icons of the content to be different in size in accordance with frequency that the content is selected. The data may include identification (ID) information of the remote control device.

The method may further include receiving a user command for executing content selected by a user, and displaying a first message, which involves names of remote control devices capable of controlling the content, on a screen if it is determined that the selected content is not controllable by the identified remote control device.

According to aspect of yet another exemplary embodiment, there is provided a display control method of the display apparatus, the method including: sensing an approach of a remote control device and making a request for information to identify the remote control device; receiving information for identifying the remote control device from the remote control device; identifying the remote control device based on the information received from the remote control device; and displaying a UI screen corresponding to the identified remote control device based on a user input.

According to an aspect of yet another exemplary embodiment, there is provided a display apparatus including a display configured to display a UI screen; a communicator configured to receive data from a remote control device; and a controller configured to identify the remote control device based on the received data, and a controller configured to control the display to display the UI screen corresponding to the identified remote control device on the display. The controller implements a function corresponding to a key value of the received data, and identifies the remote control device based on the implemented function. The data may include a command for controlling a screen display of the display apparatus.

The controller receives a user command to execute one piece of the content, and controls the display to display a first message, which involves names of remote control devices capable of controlling the content, on a screen if it is determined that the content is not controllable by the identified remote control device.

According to an aspect of yet another exemplary embodiment, there is provided a display apparatus including: a display configured to display a user interface (UI) screen; a sensing portion configured to sense an approach of the remote control device; and a controller configured to make a request for information to identify the remote control device to the remote control device based on sensing results of the sensing portion, receive the information for identifying the remote control device from the remote control device, identify the remote control device based on the received information, and control the display to display the UI screen corresponding to the identified remote control device thereon based on a user input.

BRIEF DESCRIPTION OF THE DRAWINGS

The above and/or other aspects will become more apparent from the following description of exemplary embodiments, taken in conjunction with the accompanying drawings, in which:

FIG. 9 is a flowchart for a display apparatus according to another exemplary embodiment providing a UI screen corresponding to an identified remote control device.

DETAILED DESCRIPTION OF EXEMPLARY EMBODIMENTS

Figure 1:
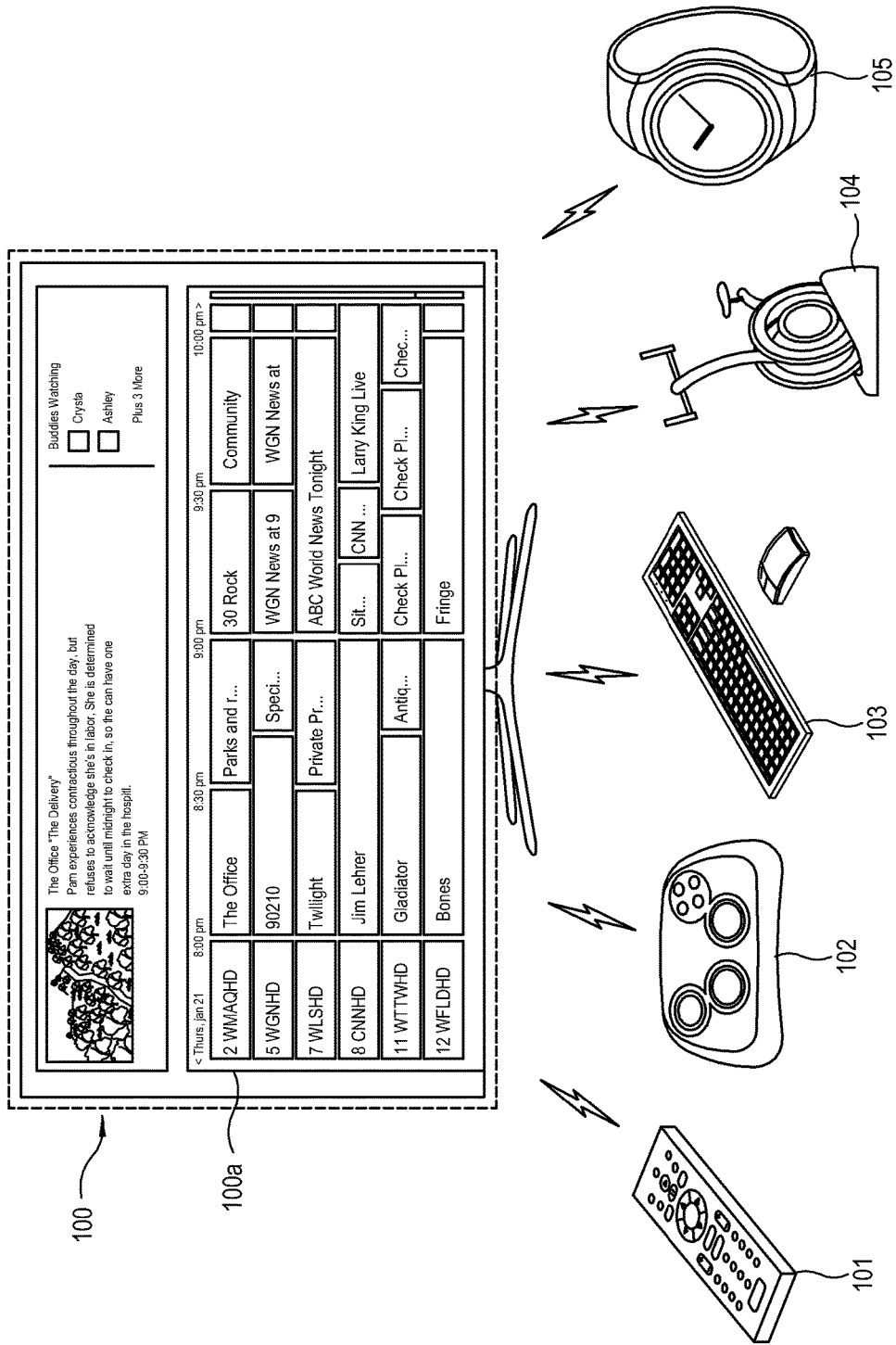
FIG. 1 illustrates a system according to an exemplary embodiment.

Below, various exemplary embodiments will be described with reference to accompanying drawings. The following embodiments have to be considered as illustrative only, and it should be construed that all suitable modification, equivalents and/or alternatives fall within the scope of the disclosure. Throughout the drawings, like numerals refer to like elements. The word "exemplary" is used herein to mean "serving as an example or illustration." Any aspect or design described herein as "exemplary" is not necessarily to be construed as preferred or advantageous over other aspects or designs.

In this document, "have," "may have," "include," "may include" or the like expression refer to presence of the corresponding features (e.g., numerical values, functions, operations, or elements of parts) and does not exclude additional features.

In this document, "A or B," "A and/or B," "at least one of A and/or B," "one or more of A and/or B," or like expression may involve any possible combination of listed elements. For example, "A or B," "at least one of A and B," or "at least one A or B" may all refer to (1) at least one A, (2) at least one B, or (3) both at least one A and at least one B.

In this document, "a first," "a second," "the first," "the second," or like expression may modify various elements regardless of order and/or importance, and be used just for distinguish an element from another element without limiting the elements. For example, a first user device and a second user device are irrelevant to order or importance, and may be used to express different user devices. For example, a first element may be named a second element and vice versa without departing from the scope of the disclosure.

If a certain element (e.g., a first element) is "operatively or communicatively coupled with/to" or "connected to" a different element (e.g., a second element), it will be understood that the certain element is directly coupled to the different element or coupled to the different element via another element (e.g., a third element). On the other hand, if a certain element (e.g., the first element) is "directly coupled to" or "directly connected to" the different element (e.g., the second element), it will be understood that no other element (e.g., a third element) is interposed between the certain element and the different element.

In this disclosure, the expression of "configured to" may be, for example, replaced by "suitable for," "having the capacity to," "designed to," "adapted to," "made to," or "capable of," in accordance with circumstances. The expression "configured to" or "set to" may not necessarily refer to only "specifically designed to" in terms of particular hardware. Instead, the "device configured to" may refer to "capable of" together with other devices or parts in a certain circumstance. For example, the phrase "the processor configured (or set) to perform A, B, and C" may refer to a dedicated processor (e.g., an embedded processor) for performing the corresponding operations, or a generic-purpose processor (e.g., a central processing unit (CPU) or an application processor (AP)) for performing the corresponding operations by executing one or more software programs stored in a memory device.

In this document, terms may be used for explaining a certain embodiment and not intended to limit the scope of other embodiments. A singular expression may imply a plural expression and vice versa unless explicitly noted otherwise. The terms set forth herein, including technical or scientific terms, have the same meanings as those generally understood by a person having an ordinary skill in the art. Among the terms used in this document, terms defined in a general-purpose dictionary may be construed to have the same or similar meanings as the contextual meanings of the related art, and should not be interpreted as ideally or excessively formal meanings unless otherwise defined. As necessary, even the terms defined in this disclosure may not be construed to exclude the embodiments of the present disclosure.

Content used in this disclosure may be a graphic object (e.g., an icon) or a name of the content that represents the content. Further, the content may include a still image, a moving image, or an application (i.e., an app).

Below, a display apparatus according to various exemplary embodiments will be described with reference to the accompanying drawings. In this document, a user may refer to a person who uses an electronic device or a person who is sensed by the device or causes an event to the device. There may be a plurality of users.

FIG. 1 illustrates a system according to an exemplary embodiment.

In FIG. 1, a display apparatus 100 and remote control devices 101, 102, 103, 104, and 105 are illustrated. The remote control devices 101, 102, 103, 104 and 105 may include a remote control 101, a game controller 102, a keyboard 103, an exercise bicycle 104, and a wearable device 105, but the disclosure is not limited thereto. Alternatively, the remote control device may include various electronic devices such as an electronic scale, an electronic balance board, etc. The remote control devices 101, 102, 103, 104, and 105 can transmit data for controlling the display apparatus 100 to the display apparatus 100. For example, if the remote control device is the remote control 101 (e.g., television remote control), the remote control 101 may transmit data to the display apparatus 100, thereby controlling the display apparatus 100.

The data transmitted from the remote control devices 101, 102, 103, 104, and 105 may include one of remote control code formats different according to the remote control devices or common remote control code formats used in common by various remote control devices. For example, the remote control code formats different according to the remote control devices may be code formats corresponding to a channel up/down button of the remote control 101, a joystick button of the game controller 102, an alphanumeric button of the keyboard 103, a pedal of the exercise bicycle 104, a touch zoom-in (i.e., pinch zoom) of a smart watch 105. For example, the common remote control code formats used in common by the remote control devices may be a code corresponding to a command for powering on the display apparatus. The data transmitted from the remote control devices 101, 102, 103, 104, and 105 can control the power of the display apparatus 100. For example, if a user presses a power button provided in the remote control 101, the display apparatus 100 receives the data and enters a power-on state.

The data transmitted from the remote control devices 101, 102, 103, 104, and 105 can control a screen displayed on the display apparatus 100. For example, if a user presses a direction button provided in the remote control 101 while the display apparatus 100 displays an electronic program guide (EPG) screen 100a, a cursor displayed on the screen of the display apparatus 100 may move up, down, left or right. If a user presses a channel up/down button provided in the remote control 101 while the display apparatus 100 displays a screen of a broadcast program, a channel of the currently viewed broadcast is switched and the switched channel is displayed.

The data transmitted from the remote control devices 101, 102, 103, 104, and 105 can control the volume of the display apparatus 100. For example, if a user presses a volume control button provided in the infrared (IR) remote control 101, the display apparatus 100 receives the data and controls the volume of the sound being reproduced by the display apparatus 100.

The remote control device may be the game controller 102, such as a joystick, a gamepad, a virtual reality (VR) wand, etc. A user may press buttons provided in the game controller 102 to thereby control the display screen of the display apparatus 100. At this time, if the display apparatus 100 receives data corresponding to a key input value that is only available on the game controller 102, the display apparatus 100 determines that the received data is transmitted from the game controller 102.

The remote control device may be the keyboard 103. A user may press a key button of the keyboard 103 to thereby control the display screen of the display apparatus 100. At this time, if the display apparatus 100 receives data corresponding to a key input value that is only available on the keyboard 103, the display apparatus 100 may determine that the received data is transmitted from the keyboard 103.

The remote control device may be the exercise bicycle 104. A user may press a key button provided in the exercise bicycle 104 to thereby control the display screen of the display apparatus 100. At this time, if the display apparatus 100 receives data corresponding to a key value provided only in the exercise bicycle 104, the display apparatus 100 may determine that the received data is transmitted from the exercise bicycle 104.

The remote control device may be the wearable device 105. A user may wear a smart watch 105 or like wearable device and manipulate a touch screen of the smart watch 105 to thereby control the display screen of the display apparatus 100. At this time, if the display apparatus 100 receives data corresponding to a key or a user input value provided only in the smart watch 105, the display apparatus 100 may determine that the received data is transmitted from the smart watch 105.

The remote control devices 101, 102, 103, 104, and 105 may communicate with the display apparatus 100 in different ways. For example, the IR remote control 101 can communicate with the display apparatus 100 by infrared signals. The game controller 102 can communicate with the display apparatus 100 by Bluetooth. The keyboard 103 can communicate with the display apparatus 100 by Bluetooth or Wi-Fi. The exercise bicycle 104 can communicate with the display apparatus 100 by Wi-Fi. The wearable device 105 can communicate with the display apparatus 100 by Bluetooth.

Because the remote control devices 101, 102, 103, 104, and 105 utilize different communication methods for communicating with the display apparatus 100, the display apparatus 100 can identify communication protocols received from the remote control devices 101, 102, 103, 104, and 105, and determine the identity of the remote control devices 101, 102, 103, 104, and 105 based on the identified protocols. For example, if the communication protocol of the received data is Bluetooth, the display apparatus 100 may narrow the candidates down to the game controller 102, the keyboard 103, and the wearable device 105 as the remote control device. If the communication protocol of the received data is infrared, the display apparatus 100 may determine the IR remote control 101 is the remote control device being used. If the communication protocol of the received data is Wi-Fi, the display apparatus 100 may determine that the exercise bicycle 104 is the remote control device being used.

The display apparatus 100 may include a storage or memory to store information about the remote control devices 101, 102, 103, 104, and 105. The information about the remote control devices 101, 102, 103, 104, and 105 may include the communication protocols associated with the remote control devices 101, 102, 103, 104, and 105, commands corresponding to the received data, and the layout information for creating or composing UI screens corresponding to the remote control devices 101, 102, 103, 104, and 105, but the disclosure is not limited thereto. Alternatively, the display apparatus may receive layout information for creating the UI screens from a server.

The remote control devices 101, 102, 103, 104, and 105 use infrared or various communication methods (e.g., Bluetooth, etc.) to transmit a control command, thereby controlling the display apparatus 100.

A user can control the display apparatus 100 by activating a key, a button, or other UI element provided in the remote control devices 101, 102, 103, 104, and 105 or using a user input. Further, a user can control the display apparatus 100 by motion recognition using a camera 145 mounted to the display apparatus 100. The user input may be received, for example, through a touch pad, voice recognition using a microphone, motion recognition using a sensor, etc. In addition, the operations of the display apparatus 100 that may be controlled may be, for example, power on/off, booting, a channel change, volume control, content playback, and the like.

A user can control the screen display of the display apparatus 100 based on motions of the remote control devices 101, 102, 103, 104, and 105 (e.g., by gripping or moving the remote control devices 101, 102, 103, 104, and 105). A user may grip, shake, rotate, or move the remote control devices 101, 102, 103, 104, and 105 to use motion sensors of the remote control devices 101, 102, 203, 104, and 105 to control the display apparatus 100 to perform operations such as switching the display apparatus 100 off (e.g., to be partially tuned on).

In response to the motions of the remote control devices 101, 102, 103, 104, and 105, the display apparatus 100 may turn on its screen. In response to the motions of the remote control devices 101, 102, 103, 104, and 105, the display apparatus 100 may partially turn on its screen. In response to the motions of the remote control devices 101, 102, 103, 104, and 105, power may be supplied to a part of the screen of the display apparatus 100.

The display apparatus information may include, for example, an output resolution (e.g., high definition (HD), full HD, ultra HD, or a higher resolution) of the display apparatus 100, information about whether the screen is curved/flat, display type (e.g., a liquid crystal display (LCD), an organic light emitting diode (OLED), an active matrix organic light-emitting diode (AMOLED), plasma display panel (PDP), a quantum dot (QD), etc.), a diagonal length of a screen (e.g., 66 cm, 80 cm, 101 cm, 152 cm, 189 cm, or higher than 200 cm), a length/width of the display apparatus 100 (e.g., 643.4 mm×396.5 mm, 934.0 mm×548.6 mm, 1,670.2 mm×962.7 mm, 2,004.3 mm×1,635.9 mm, etc.), an aspect ratio of the display apparatus 100 (e.g., 4:3, 16:9, 16:10, 21:9, or 21:10), and so on.

The display apparatus information may also refer to information corresponding to a document or manual published on a webpage of a manufacturer of the display apparatus 100.

The display apparatus information may be stored in the storage of the display apparatus 100. Further, the display apparatus information may be downloaded from an outside source through a communicator (e.g., network adapter, modem, etc.) under control of a controller of the display apparatus 100.

It will be appreciated by a person having an ordinary skill in the art that the items of the display apparatus information may vary depending on the performance and structure of the display apparatus 100.

The remote control devices 101, 102, 103, 104, and 105 may include keys or buttons corresponding to the functions and/or operations of the display apparatus 100. Here, a key may include a physical button or a touch-sensitive button. Further, the remote control devices 101, 102, 103, 104, and 105 may include a single-function key and/or a multi-function key corresponding to functions to be implemented in the display apparatus 100.

The single-function keys may include, for example, a power button, a pointer key, etc. of the remote control devices 101, 102, 103, 104, and 105, may refer to a key corresponding to one function among a plurality of functions to be implemented in the display apparatus 100. Most keys provided in the remote control devices 101, 102, 103, 104, and 105 may be provided as single-function keys.

The multi-function keys may include, for example, color-coded keys of the remote control devices 101, 102, 103, 104, and 105, and may refer to keys that may perform one of multiple functions in accordance with functions to be implemented in the display apparatus 100. For example, color-coded keys may include a red key, a green key, a yellow key, and a blue key. The color keys may be variously arranged, and the number of color keys may be added, modified or reduced in accordance with the functions of the display apparatus 100. Different functions can be assigned to each of these different colored keys and the key binding information may be displayed on the display screen such that the user can press the buttons to perform the variously assigned functions.

Figure 2:
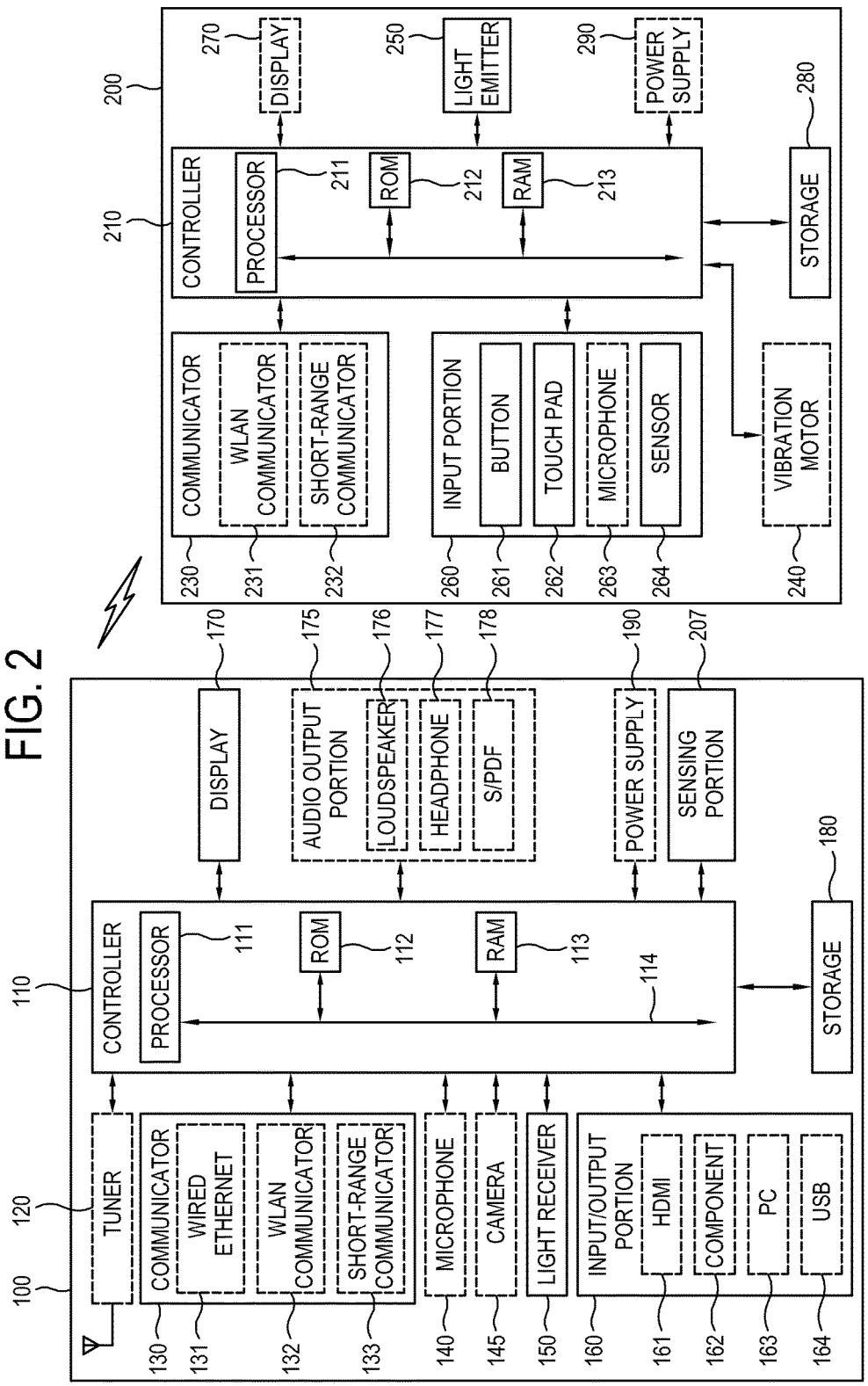
FIG. 2 is a block diagram of a display apparatus and a remote control device according to an exemplary embodiment.

FIG. 2 is a block diagram of a display apparatus and a remote control device 200 according to an exemplary embodiment.

In FIG. 2, the display apparatus 100, which receives control information (or data) from the remote control device 200, may be connected to an external electronic device via a communicator 130 or an input/output portion 160 by a wire or wirelessly. The external electronic device may be a cellular phone, a smart phone, a tablet personal computer (PC), a PC, or a server. Further, the display apparatus 100 can communicate with the remote control device 200 via the communicator 130.

The display apparatus 100 includes a display 170, and may additionally include a tuner 120, the communicator 130, and/or the input/output portion 160. The display apparatus 100 may include the display 170, and may additionally include a combination of the tuner 120, the communicator 130, and the input/output portion 160. In addition, the display apparatus 100 including the display 170 may be electrically connected to a separate electronic device having a tuner.

The display apparatus 100 may be, for example, an analog TV, a digital TV, a 3D TV, a smart TV, an LED TV, an OLED TV, a plasma TV, a monitor, a curved TV with a screen having an invariable curvature, a flexible TV with a screen having variable curvature, a bended TV with a screen having variable curvature, and/or a TV with a screen of which a curvature is variable depending on a user's input. However, it will be appreciated by a person having an ordinary skill in the art that the display apparatus 100 is not limited to the foregoing examples.

The display apparatus 100 includes the tuner 120, the communicator 130, a light receiver 150, the input/output portion 160, the display 170, an audio output portion 175, a storage 180, and a power supply 190. The display apparatus 100 may include functional portions such as a sensor (e.g., an illumination sensor, a temperature sensor, etc.) for sensing an internal or external state of the display apparatus 100, a microphone, a camera, or the like.

The controller 110 may include a processor 111, a non-volatile memory such as a read-only memory (ROM) 112, in which a control program for controlling the display apparatus 100 is stored, and a volatile memory such as a random access memory (RAM) 113 storing a signal or data received from the outside of the display apparatus 100 or used as a storage area corresponding to various jobs performed in the display apparatus 100.

The controller 110 controls general operations of the display apparatus 100 and signal flow between the elements 120 to 195 of the display apparatus 100, and processes data. The controller 110 controls power supplied from the power supply 190 to the elements 120 to 195. If a user input is received or a preset condition is satisfied, the controller 110 can execute an operating system (OS) and various applications stored in the storage 180.

The processor 111 may include a graphic processing unit for processing graphics corresponding to a picture or image. The processor 111 may be a central processing unit (CPU), or a system on chip (SoC) combined with the GPU and other functional elements. Further, the processor 111 may include the ROM 112 and/or the RAM 113. The processor 111 may consist of a single core, dual cores, triple cores, quad cores, or multiple cores.

The processor 111 may include a plurality of processors. The plurality of processors may include a main processor that operates in one of states of the display apparatus 100, such as a pre-power on mode, a welcome mode and/or a normal mode of displaying a broadcast image, and a sub-processor that operates in one of other states of the display apparatus 100, such as a screen-off (or power-off) mode and/or a pre-power on mode.

The plurality of processors included in the controller 110 (e.g., the main processor and the sub-processors) may operate or may not operate in accordance with the states of the display apparatus 100. For example, the main processor may operate in the pre-power on mode, the welcome mode and/or the normal mode. In the pre-power on mode, the welcome mode, and/or the normal mode, the controller 110 including the main processor may also operate. The one or more sub-processors may operate in the screen-off mode and/or the pre-power on mode. In the screen-off mode and/or the pre-power on mode, the controller 100 including the sub processor may also operate.

The plurality of processors may include the main processor, the sub processor(s), and a sensor processor for controlling the sensors. Further, the plurality of processors may include the main processor and the sensor processors.

The processor 111, the ROM 112 and the RAM 113 may connect with one another through a bus 114.

The controller 110 receives data from the remote control device 200 through the communicator 130, identifies the remote control device 200 based on the received data, and controls the display 170 to display a UI screen corresponding to the identified remote control device thereon. The data may include a command for controlling the screen display of the display apparatus 100. The data may include a command for controlling a sound volume of the display apparatus 100. The data may include identification or identifier (ID) information of the remote control device.

A UI screen may show a list of content items controllable by the identified remote control device. The UI screen may be displayed to visually distinguish between the various content items controllable by the identified remote control device. The UI screen includes a plurality of pieces of content, and the controller 110 controls the display to display one or more pieces of content corresponding to the identified remote control device among the plurality of pieces of content to be visually distinguished from the other pieces of content.

The controller 110 groups one or more pieces of content according to categories and controls the display to display them to be distinguished from the other pieces of content. The controller 110 may control the display to display one or more pieces of content to be highlighted or changed in color or size. The controller 110 may control the display to additionally display a preset graphic object on one or more pieces of content. The controller 110 may control the display to display icons corresponding to the content to be different in size according to frequencies of selecting each piece of content based on a use history of the display apparatus.

The controller 110 performs a function corresponding to a key value of received data if the data is received from the remote control device 200, and identifies the remote control device based on the performed function. The remote control device may have its own specific button. For example, a television remote control may have a menu button or a channel up/down button. A game controller may have a joystick button for moving a game character. A keyboard may have buttons for inputting alphanumeric characters. An exercise bicycle may have a pedal. A smart watch or like wearable devices may enable a user to do a pinch zoom-in operation through a touch screen.

If a user presses the menu button of the television remote control, the remote control transmits data corresponding to the menu button to the display apparatus 100, and the display apparatus 100 receives the data corresponding to the menu button to perform a function of displaying a menu on a screen and identifies the corresponding remote control device 200 as the television remote control in accordance with the received key value that corresponds to the menu button. Further, if a user presses the channel up/down button of the remote control, the remote control transmits data corresponding to channel up/down to the display apparatus 100. Subsequently, the display apparatus 100 receives the data corresponding to the channel up/down button to control its own tuner and changes a channel from a currently viewed broadcast channel and identifies the remote control device 200 as the remote control in accordance with a key value received corresponding to the channel up/down button. Since the remote control device 200 is identified as the television remote control, the controller 110 controls the display to display the UI screen corresponding to the television remote control. The UI screen may show the list of content controllable by the remote control.

If a user moves the joystick or a direction pad of the game controller up, down, left, or right, the game controller transmits data corresponding to the joystick to the display apparatus 100, and the display apparatus 100 receives the data corresponding to the joystick to move a cursor displayed on the screen in one of four directions and identifies the corresponding remote control device 200 as the game controller in accordance with a key value received corresponding to the joystick. Because the remote control device 200 is identified as the game controller, the controller 110 controls the display to display the UI screen corresponding to the game controller. This interface screen may show a list of content items controllable by the game pad.

If a user inputs a character through the keyboard, the keyboard transmits data corresponding to an input key value to the display apparatus 100. Subsequently, the display apparatus 100 receives data corresponding to the key value to input the character corresponding to the key value to the display apparatus 100 and identifies the remote control device 200 as the keyboard. Because the remote control device 200 is identified as the keyboard, the controller 110 controls the display to display the UI screen corresponding to the keyboard. This interface screen may show a list of content items controllable by the keyboard.

If a user presses down the pedals of the exercise bicycle, the exercise bicycle transmits data corresponding to revolutions of the pedals to the display apparatus 100, and the display apparatus 100 receives the data to display a graphic object in accordance with the number and/or speed of revolutions of the pedals and identifies the corresponding remote control device 200 as the exercise bicycle. Because the remote control device 200 is identified as the exercise bicycle, the controller 110 controls the display to display the UI screen corresponding to the exercise bicycle. This interface screen may show a list of content items controllable by the exercise bicycle.

If a user does the pinch zoom operation in the smart watch, the smart watch transmits data corresponding to the pinch zoom to the display apparatus 100 and the display apparatus 100 receives the data to perform an operation of zooming in or out the screen and identifies the corresponding remote control device 200 as the smart watch. Because the remote control device 200 is identified as the smart watch, the controller 110 controls the display to display the UI screen corresponding to the smart watch. This interface screen may show a list of content items controllable by the smart watch.

The controller determines a communication protocol used for receiving data when the data is received from the remote control device 200, and identifies the type of the remote control device 200 based on the determined protocol.

For example, if a user presses a button on the television remote control, the remote control may transmit data corresponding to the button by infrared. The display apparatus identifies the remote control device 200 as the television remote control based on the data received by an infrared receiver.

If a user presses a joystick button on the game controller, the game controller may transmit data corresponding to the joystick button by Bluetooth. The display apparatus may identify the corresponding remote control device 200 as the game controller if it is determined that Bluetooth is used in receiving the data through the communicator.

If a user presses a key on the keyboard, the keyboard may transmit data corresponding to the key value to the display apparatus by Wi-Fi. The display apparatus may identify the corresponding remote control device 200 as the keyboard if it is determined that Wi-Fi is used in receiving the data through the communicator.

The controller 110 receives a user command for executing the content selected by a user, and controls the display to display a first message, which lists the names of the remote control devices capable of controlling the content, if it is determined that the selected content is not controllable by the identified remote control device.

The controller 110 employs a sensing portion 207 to sense an approach of the remote control device, makes a request for information about identification of the remote control device to the remote control device based on the sensing results of the sensing portion 207, receives the information about the identification of the remote control device from the remote control device, identifies the remote control device based on the received information, and controls the display to display the UI screen thereon corresponding to the identified remote control device in accordance with a user input. The user input may be a command issued to enter a content list mode.

The sensing portion 207 may, for example, measure physical quantity or sense the operating state of the display apparatus 100, and convert the measured or sensed information into an electric signal. The sensing portion 207 may include, for example, a gesture sensor, a gyroscopic sensor, a barometer, a magnetic sensor, an accelerometer, a proximity sensor, a color sensor (e.g., a red, green, and blue (RGB) sensor), a biosensor, a temperature/humidity sensor, an illumination sensor, and/or an ultra violet (UV) sensor. Additionally or alternatively, the sensing portion 207 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint scanner. The sensing portion 207 may further include a control circuit for controlling at least one sensor involved therein. Alternatively, the display apparatus 100 may further include a processor for controlling the sensing portion 207 as a part of the processor 111 or as a separate element, thereby controlling the sensing portion 207 while the processor 111 is in a sleep mode.

In this embodiment, the controller 110 includes the processor 111, the ROM 112 and the RAM 113 of the display apparatus 100. Further, the controller 110 includes the main processor, any sub-processor(s), the ROM 112 and the RAM 113 of the display apparatus 100.

It will be appreciated by a person having an ordinary skill in the art that the elements and operations of the controller 110 are variable depending on exemplary embodiments.

The tuner 120 may be selectively tuned to a frequency of a channel desired to be received in the display apparatus 100 among various electromagnetic waves by applying amplification, mixing, resonance, etc. to a broadcast signal received by a wire or wirelessly. The broadcast signal includes video data, audio data, and additional data (e.g., electronic program guide (EPG)).

The tuner 120 may receive video, audio, and additional data in a frequency band corresponding to a channel number (e.g., a cable broadcast channel number 605) in accordance with data (e.g., a channel number input, a channel up/down input, etc.) received via a user input (e.g., from the remote control device).

The tuner 120 may receive a broadcast signal from various sources such as a terrestrial broadcast, a cable broadcast, a satellite broadcast, an Internet broadcast, etc. The tuner 120 may receive a broadcast signal from a source such as an analog broadcast, a digital broadcast, etc. The tuner 120 may be integrated into the display apparatus 100 as part of an all-in-one device, or may be implemented as a separate device (e.g., a set-top box) electrically connected to the display apparatus 100 through the input/output portion 160.

The communicator 130 connects the display apparatus 100 with the remote control device 200 and/or any other electronic devices under control of or in communication with the controller 110. The controller 110 may download an application from an external source or browse a website through the communicator 130. Further, the communicator 130 may receive data corresponding to control of the display apparatus 100 from the remote control device 200 under control of the controller 210.

The communicator 130 may be a network adapter, a modem, or an interface. For example, the communicator 130 may include at least one of a wired Ethernet adapter 131, a wireless local area network (WLAN) communicator 132, and a short-range communicator 133 (e.g., Infrared Data Association (IrDA), near-field communication (NFC), Bluetooth, etc.) in accordance with specification and structure of the display apparatus 100. Further, the communicator 130 may include a combination of the Ethernet adapter 131, the WLAN communicator 132, and the short-range communicator 133.

In this exemplary embodiment, the communicator 130 receives data from the remote control device 200. Further, the short-range communicator 133 may receive data from the remote control device 200 under control of the controller 210.

A microphone 140 receives a voice uttered by a user. The microphone 140 converts the received voice into an electric signal and outputs it to the controller 110. A user's voice may, for example, include a voice corresponding to a command for controlling the menu or function of the display apparatus 100. The microphone 140 may have a varying recognition range depending on the loudness of a user's voice and/or surrounding environments (e.g., sound of a loudspeaker, ambient noise, etc.).

The microphone 140 may be integrated into or separated from the display apparatus 100. The separated microphone 140 may be electrically connected to the display apparatus 100 through the communicator 130 or the input/output portion 160.

The camera 145 may generate a video footage (e.g., record successive frames of images) corresponding to a user's motion within its recognition range. A user's motion may, for example, capture a user's presence (e.g., a user gets within the recognition range of the camera); a user's body part, such as a face, an expression, a hand, a fist, fingers, etc.; a motion or gesture made by a user's body part; etc. The recognition range of the camera 145 may be a distance of 0.2-5 m from the camera 145 to a user.

The camera 145 may include a lens and an image sensor. The camera 145 may use a plurality of lenses and image processing to support an optical or digital zoom.

The camera 145 may be placed an upper side, a bottom side, a left side, or a right side of the display apparatus 100. Further, the camera 145 may be placed at an upper center area, a lower right area, a lower center area, a lower left area, or anywhere else in the vicinity of the display apparatus 100.

In this exemplary embodiment, the camera 145 can photograph a user (or a user's motion) even when the display apparatus 100 is powered off by the power supply 190, as long as a power plug is connected to a power socket. Further, the camera 145 can photograph a user (or a user's motion) even when the screen of the display apparatus 100 is turned off by the power supply 190, as long as a power plug has is connected to a power socket.

The camera 145 converts a photographed image into an electric signal under control of the controller 110 and outputs it to the controller 110. The controller 110 analyzes the photographed image and recognizes a user's motion. The controller 110 displays a menu on the display apparatus 100 in accordance with motion recognition results, or performs control (e.g., channel change, volume control, etc.) corresponding to the motion recognition results.

If a plurality of cameras 145 are provided, the first camera placed in the front of the display apparatus 100 and a second camera adjacent to the first camera 145 (e.g., a distance between the first camera and the second camera may be greater than 10 mm and smaller than 80 mm) may be used to capture a stereoscopic 3D still image or video.

The camera 145 may be integrated into or separated from the display apparatus 100. An electronic device including the separated camera may be electrically connected to the display apparatus 100 through the communicator 130 or the input/output portion 160.

The light receiver 150 receives an optical signal (including data) from the remote control device 200 through a light window.

The light receiver 150 can receive an optical signal corresponding to a user input (e.g., a touch, a button press, a touch gesture, a voice, a motion, etc.) from the remote control device 200. It is possible to extract data from the received optical signal. The received optical signal and/or the extracted data may be transmitted to the controller 110. The light receiver 150 may receive visible, infrared, or ultraviolet light.

The input/output portion 160 receives content from a source external to the display apparatus 100 under control of the controller 110. The content may, for example, include a video, an image, a text, or a web document. Further, the content may include a video involving an advertisement, an image involving an advertisement, or a web document involving an advertisement.

The input/output portion 160 may include at least one of high definition multimedia interface (HDMI) port 161, a component jack 162, a personal computer (PC) port 163 (e.g., Video Graphics Array (VGA) port, a Digital Visual Interface (DVI) port, a DisplayPort, an Institute of Electrical and Electronics Engineers (IEEE) 1394 port, a Thunderbolt port, etc.), and a universal serial bus (USB) jack 164, corresponding to reception of the content. The input/output portion 160 may include a combination of the HDMI port 162, the component jack 162, the PC port 163 and the USB jack 164. It will be easily understood by a person having an ordinary skill in the art that the ports in the input/output portion 160 may be added, removed and/or modified according to the performance and structure of the display apparatus 100.

The display 170 may display an image or a video included in a broadcast signal received through the tuner 120 under control of the controller 110. The display 170 displays content (e.g., a video) received through the communicator 130 or the input/output portion 160. The display 170 can output content stored in the storage 180 under control of the controller 110. Further, the display 170 can display a voice UI for performing a voice recognition task corresponding to voice recognition, or a motion UI for performing a motion recognition task corresponding to motion recognition. For example, the voice UI may include a voice command guide, and the motion UI may include a motion command guide in inform a user of available voice or motion commands that may be issued.

In this exemplary embodiment, the screen of the display apparatus 100 may refer to the display 170 of the display apparatus 100.

According to this exemplary embodiment, the display 170 may display a welcome screen corresponding to a first control signal received from the remote control device 200 under control of the controller 110.

According to another exemplary embodiment, the display 170 may be separated from the display apparatus 100. The display 170 may be electrically connected to the display apparatus 100 through the input/output portion 160 of the display apparatus 100.

The audio output portion 175 outputs audio data included in the broadcast signal received through the tuner 120 under control of the controller 110. The audio output portion 175 may output audio data (e.g., a voice and/or sound) received through the communicator 130 or the input/output portion 160. Further, the audio output portion 175 may play back an audio file stored in the storage 180 under control of the controller 110.

The audio output portion 175 may include at least one of a loudspeaker 176, a headphone output terminal 177, and a Sony Philips digital interface (S/PDIF) output terminal 178. Alternatively, the audio output portion 175 may include a combination of the loudspeaker 176, the headphone output terminal 177, and the S/PDIF output terminal 178.

In this embodiment, the audio output portion 175 may output audible feedback corresponding to the display of the welcome screen in response to the first control signal received from the remote control device 200 under control of the controller 110 of the display apparatus 100.

The storage 180 may store a variety of data, programs, or applications for driving and controlling the display apparatus 100 under control of the controller 110. The storage 180 may store a signal, instructions, or data corresponding to operations of the tuner 120, the communicator 130, the microphone 140, the camera 145, the light receiver 150, the input/output portion 160, the display 170, the audio output portion 175, and the power supply 190.

The storage 180 may store control programs for controlling the display apparatus 100 and the controller 110; applications initially provided by a manufacturer or downloaded from an external source; a graphical user interface (GUI) related to the application; objects and assets (e.g., an image, text, an icon, a button, etc.) for providing the GUI; data related to user information, document, databases, and so forth; etc.

The storage 180 may include a broadcast receiving module, a channel control module, a volume control module, a communication control module, a voice recognition module, a motion recognition module, a light receiving module, a display control module, an audio control module, an external input control module, a power control module, a voice database, or a motion database. The modules and databases stored in the storage 180 may be achieved by hardware and/or software to perform a broadcast receiving function, a channel control function, a volume control function, a communication control function, a voice recognition function, a motion recognition function, a light receiving function, a display control function, an audio control function, an external input control function, a power control function in the display apparatus 100. The controller 110 may control the display apparatus 100 to perform the functions based on the software stored in the storage 180.

The storage 180 may store the display apparatus information or the remote control device information.

The storage 180 may store a moving image, a still image, or text corresponding to visual feedback.

The storage 180 may store a sound corresponding to the audible feedback.

The storage 180 may store a feedback offering time (e.g., 300 ms), during which the feedback is offered to a user.

In this embodiment, "the storage" may refer to the storage 180; the storage achieved by the ROM 112, the RAM 113, and the SoC of the controller 110; a memory card (e.g., a micro Secure Digital (SD) card, USB memory, etc.) mounted to the display apparatus 100; or an external storage (e.g., a USB memory, etc.) connectable to the USB port 164 of the input/output portion 160. Further, the storage may include a nonvolatile memory, a volatile memory, a hard disk drive (HDD) or a solid-state drive (SSD).

The power supply 190 supplies power from an external power source to the elements 110 to 195 of the display apparatus 100 under the control of the controller 110. The power supply 190 may supply power from one or more batteries placed inside the display apparatus 100 to the elements 120 to 195 under control of the controller 110. The power supply 190 may also supply power from an external alternating current (AC) or direct current (DC) power source.

The power supply 190 may include a first power supply for supplying power to the camera 145 in the power-off state of the display apparatus 100 (or in the screen-off mode of the display apparatus 100 while the power plug is being connected to the power socket). The power supply 190 may include the first power supply for supplying power to the camera 145 of the display apparatus 100 which is powered off (while the power plug is connected to the power socket) and to the sub-processor controlling the camera 145. Further, the power supply 190 may include the first power supply for supplying power to the camera 145 of the display apparatus 100 which is powered off (while the power plug is connected to the power socket) and to a sensor processor for controlling the camera 145.

The power supply 190 may include a battery for supplying power to the camera 145 of the display apparatus 100 which is powered off (while the power plug is connected to the power socket).

At least one element may be added, modified or deleted (e.g., at least one of the dotted boxes) among the elements (e.g., 110 to 195) of the display apparatus 100 shown in FIG. 2 in accordance with the performance and/or kind of the display apparatus 100. Further, it will be easily understood by a person having an ordinary skill in the art that the positions of the elements (e.g., 110 to 195) are changeable in accordance with the performance or structures of the display apparatus 100.

Below, an example of controlling the screen of the display apparatus will be described in detail.

In FIG. 2, the remote control device 200 for remotely controlling the display apparatus 100 includes a controller 210, a communicator 230, an input portion 260, a light emitter 250, a display 270, a storage 280 and a power supply 290. The remote control device 200 may include one or both of the communicator 230 or the light emitter 250.

The remote control device 200 may refer to an electronic device capable of remotely controlling the display apparatus 100. As used herein, the term "remote" does not necessary signify a great distance away from the display apparatus 100, but does indicate that the controlling device is a separate entity from the display apparatus 100. Further, the remote control device 200 may include an electronic device in which a software application for controlling the display apparatus 100 is installable (or downloadable from the outside). The electronic device may encompass both special-purpose and general-purpose devices such as a television remote control, a set-top box remote control, a universal remote control, a computer, a smartphone, and a tablet computing device.

The electronic device, in which the application for controlling the display apparatus 100 is installable, may have a display (e.g., a display panel without a touch screen or a touch panel). The electronic device with the display may include a cellular phone, a smart phone, a tablet PC, a notebook computer, other display apparatuses, and home appliances (e.g., a refrigerator, a washing machine, a cleaner, etc.). Thus, a user can control the display apparatus 100 by using a functional key (e.g., a channel key) on a GUI provided in the executed application.

The controller 210 may include the processor 211, the ROM (or other non-volatile memory) 212, where a control program for controlling the remote control device 200 is stored, and the RAM (or other volatile memory) 213, where a signal or data received from the outside of the remote control device 200 is stored or which is used as a storage area for various tasks performed by the remote control device 200.

The controller 210 controls general operations of the remote control device 200 and signal flow between the elements 220 to 290, and processes the data. The controller 210 controls the power supply 290 to supply power to the elements 220 to 280.

The controller 210 controls the sensor 264 for sensing the motion of the remote control device 200, the input portion having the button and the touch pad for receiving a user's input, and the communicator 230 for connecting with the display apparatus 100, and controls the communicator 230 to transmit the data corresponding to the detected motion of the remote control device 200 to the display apparatus.

The controller 210 may control the light emitter 250 or the communicator to transmit at least one piece of the data to the display apparatus 100.

The controller 210 may provide haptic feedback, visual feedback, and/or audible feedback in response to at least one of the first control signal and the second control signal.

According to this embodiment, the controller 210 may refer to the processor 211, the ROM 212 and the RAM 213 of the remote control device 200.

The communicator 230 sends data (e.g., control information corresponding to power-on, or control information corresponding to the motion of the remote control device, etc.) in accordance with a user input (for example, touch, press, a touch gesture, a voice, or a motion) to the display apparatus 100 to be controlled, under control of the controller 210. The communicator 230 may wirelessly connect with the display apparatus 100 under control of the controller 210. The communicator 230 may include the WLAN communicator 231 and/or the short-range communicator 232.

The WLAN communicator 231 may wirelessly connect with an access point (AP) under control of the controller 210. The WLAN communicator 231 may, for example, perform communication based on standard Wi-Fi protocols. The WLAN communicator 131 supports WLAN standards (e.g., IEEE 802.11x) of the IEEE. Further, the short-range communicator 232 allows the short-range communication between the remote control device 200 and an external device wirelessly without the AP under control of the controller 110. For example, the short-range communication may include Bluetooth, Bluetooth low energy, IrDA, Ultra-Wideband (UWB), NFC, etc.

The input portion 260 may include a button 261 or a touch pad 262 for receiving a user input (e.g., a touch or a press) for controlling the display apparatus 100. The input portion 260 may further include a microphone 263 for receiving a user's voice, a sensor 264 for detecting a motion of the remote control device 200, and/or a vibration motor 240 for providing haptic feedback.

The input portion 260 may output an electric signal (e.g., an analog signal or a digital signal) corresponding to the received user input (e.g., a touch, a press, a touch gesture, a voice, or a motion).

The button 261 may include single-function keys and/or multi-function keys as described above. The touch pad 262 may receive a user's touch or a user's touch gesture. The touch pad 262 may be provided in an area where a direction key and an enter key are positioned. Further, the touch pad 262 may be placed in the front of the remote control device 200, where the button 261 is not positioned.

The microphone 263 receives a user's uttered voice. The microphone 263 can convert the received voice into an electric signal and output it to the controller 210.

The sensor 264 can detect various internal or external states of the remote control device 200. For example, the sensor 264 may include a motion sensor for sensing the motion of the remote control device 200, a gyroscopic sensor for sensing a direction or orientation based on rotational inertia of the remote control device 200, an accelerometer for sensing acceleration applied to the remote control device 200 with regard to three axes (i.e., an X axis, a Y axis and a Z axis), or a gravity sensor for detecting the direction of gravity. The sensor 264 can measure the motion or gravitational acceleration of the remote control device 200.

According to an exemplary embodiment, the sensor 264 may detect the motion (or acceleration) of the remote control device 200 due to a user movement. The controller 210 generates a control signal corresponding to the motion of the remote control device 200 and transmits the signal to the display apparatus 100 through the communicator 230.

The vibration motor 240 transforms an electric signal into mechanical vibration under control of the controller 210. For example, the vibration motor 240 may be a linear vibration motor, a bar-type vibration motor, a coin-type vibration motor, or a piezoelectric vibration motor. When receiving data from the display apparatus 100, the controller 210 of the remote control device 200 may activate or deactivate the vibration motor 240. A single vibration motor or a plurality of vibration motors may be provided inside the remote control device 200. Further, the vibration motor 240 may vibrate the entirety of the remote control device 200 or vibrate only a part of the remote control device 200.

According to an exemplary embodiment, the vibration motor 240 may provide the haptic feedback corresponding to transmission of data under control of the controller 210. The vibration motor 240 may provide a variety of haptic feedback (e.g., strength and duration of vibration corresponding to various haptic patterns) stored in the storage 280 in accordance with data transmitted by the controller 210.

The light emitter 250 outputs an optical signal (e.g., data) corresponding to a user input (e.g., a touch, a press, a touch gesture, a voice, or a motion) under control of the controller 210. The output optical signal may be received by the light receiver 150 of the display apparatus 100. Remote control code formats used in the remote control device 200 may be a remote control code format specific to a manufacturer or a standard remote control code format commonly shared by multiple manufacturers. The remote control code format may include a leader code and a data word. The output optical signal may be modulated and output a carrier wave. The data may be stored in the storage 280 or generated by the controller 210. The remote control device 200 may include an infrared-laser emitting diode (IR-LED).

The remote control device 200 may include one or both of the communicator 230 and the light emitter 250 for transmitting data to the display apparatus 100.

The controller 210 outputs data corresponding to a user input to the display apparatus 100 through the communicator 230 and/or the light emitter 250. Further, the controller 210 may output data corresponding to the motion of the remote control device 200 to the display apparatus 100 via the communicator 230 and/or the light emitter 250.

The controller 210 may preferentially transmit data corresponding to a user input and/or data corresponding to the motion of the remote control device 200 to the display apparatus 100 through one of the communicator 230 and the light emitter 250 (e.g., via the communicator 230).

The display 270 may be, for example, an LCD display, an OLED display, a PDP display, or a VFD display.

The display 270 may display a channel number of a broadcast image displayed on the display apparatus 100, a broadcast channel name and/or the status (e.g., the screen-off mode, the pre-power on mode, the welcome mode, and/or the normal mode) of the display apparatus, etc.

If the remote control device 200 and the display apparatus 100 are connected by short-range communication, the display 270 may display a text of "BT connected" or "NFC connected" under control of the controller 210.

When the remote control device 200 outputs an optical signal to the display apparatus 100, the display 270 may display a text, an icon, or a symbol corresponding to "TV on" for turning on the display apparatus 100, "TV off" for turning off the display apparatus 100, "Ch No." for displaying the tuned channel number, or "Vol level" for showing a volume level.

The storage 280 may store a variety of data, programs, or applications for driving and controlling the remote control device 200 under control of the controller 210. The storage 280 may store signals, instructions, or data input or output corresponding to the operations of the communicator 230, the light emitter 250, and the power supply 290. The storage 280 may store data corresponding to a user input (e.g., a touch, a press, a touch gesture, a voice, or a motion) and/or data corresponding to a motion of the remote control device 200.

The storage 280 may store the remote control device information corresponding to the remote control device 200. The remote control device information may include a model name, a device ID, an available memory space, presence of object data, Bluetooth version information, or a Bluetooth profile.

The storage 280 may store first data corresponding to the motion of the remote control device 200, which will be transmitted to the display apparatus 100. The first data may be a set of first data corresponding to the respective motions of the remote control device 200.

The storage 280 may store second data corresponding to a selection (i.e., activation) of the power button, which will be transmitted to the display apparatus 100.

The storage 280 may store one or more haptic patterns. The haptic pattern may be expressed as a wave form. The haptic pattern may, for example, indicate vibration time (e.g., in units of 50 ms) of the vibration motor 240 in abscissa plotted against vibration strength (e.g., in units of 500 mV) of the vibration motor 240 in ordinate. For example, a first haptic pattern may be a series of vibration that repeats a pattern of gradually increasing from 0 V to 800 mV, gradually decreasing to 100 mV and increasing again. Further, an acceleration section and a deceleration section may be symmetrical to each other.

As another example, a second haptic pattern may be a series of vibration that repeats a pattern of gradually increasing from 0 V to 900 mV, rapidly decreasing to 500 mV, gradually decreasing to 200 mV, and increasing again. Further, a third exemplary haptic pattern may be a series of vibration that repeats a pattern of gradually increasing from 0 V to 950 mV, rapidly decreasing to 100 mV and increasing again.

If there are a plurality of haptic patterns, one of them may be stored as a favorite haptic pattern as selected by a user. If the favorite haptic pattern is set, the controller 210 may preferentially provide the favorite haptic pattern as the haptic feedback through the vibration motor 240.

It will be easily appreciated by a person having an ordinary skill in the art that haptic patterns may be added, modified, or deleted in accordance with the functions or structures of the remote control device 200.

The power supply 290 supplies power to the elements 220 to 280 of the remote control device 200 under control of the controller 210. The power supply 290 may supply power from one or more batteries placed in the remote control device 200 to the elements 210 to 280. The battery may be placed in between a front cover (e.g., having the key 261 or the touch pad 262) and a rear cover of the remote control device 200.

At least one element (e.g., at least one of the dotted boxes) may be added to or removed from the elements shown in the remote control device 200 of FIG. 2 may be in accordance with the performance of the remote control device 200. Further, it will be easily understood by a person having an ordinary skill in the art that the positions of the elements may be varied depending on the performance or structure of the remote control device 200.

Each of the components and elements illustrated in FIG. 2 in relation to the display apparatus 100 and the remote control device 200, such as the communicator 130, the input/output portion, the audio portion 175, the communicator 230, the input portion 260, etc., may be implemented with hardware, software, or a combination thereof. For example, each of the components shown in FIG. 2 may be implemented by one or more processors and a memory storing instructions which, when executed by the one or more processors, may perform respective operations and functions of the elements as discussed above. The one or more processors may or may not be part of the controller 110.

FIGS. 3 to 6 illustrate examples of how the display apparatus 100 may identify the remote control device 200 and provide a screen corresponding to the identified external device.

Figure 3:
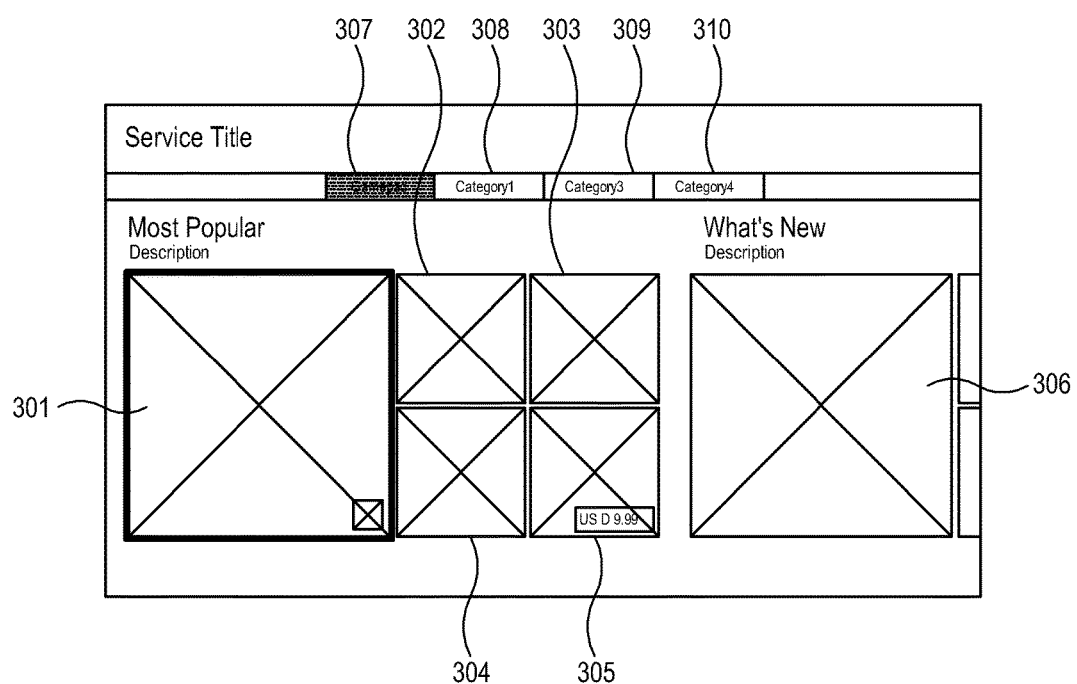
FIGS. 3, 4, 5 and 6 illustrate an exemplary display apparatus identifying the remote control device and providing a screen corresponding to the identified external device.

In FIG. 3, a list of content items 301, 302, 303, 304, 305, and 306 and category names 307, 308, 309, and 310 are displayed on the display of the display apparatus 100. The list of content items 301, 302, 303, 304, 305, and 306 may show icons corresponding to various apps. Each of the apps may be a program, a moving image file, a tile, a still image, or a text. A user may select one piece of content in the list of content items 301, 302, 303, 304, 305, and 306, and execute the selected one. At this time, the icon corresponding to the content selected by a user may be visually distinguished from the other icons. For example, the display apparatus may display the icon, which corresponds to the selected content, to be emphasized (highlighted) or altered in color or size, and thus distinguished from the other content items.

The display apparatus receives data from the remote control device 200, and identifies the type of the remote control device 200 based on the received data. To identify the type of the remote control device 200, the display apparatus implements a function corresponding to received data if the data is received from the remote control device 200, and performs learning to identify the remote control device. For example, if a user presses a direction button on the game controller to browse a web page displayed on the display apparatus 100, the display apparatus 100 first performs an operation corresponding to a key value based on the information stored in the storage or received from the server if receiving the data corresponding to the direction key of the game controller is received, and then analyzes the data to identify the remote control device as a game controller.

Alternatively, the display apparatus may analyze a data communication protocol of the game controller and a key value of the received data, and identify the remote control device as a game controller based on the key value and the communication protocols.

If a user issues a command to enter a mode for displaying a list of content or apps after the type of the remote control device is identified, the display apparatus enters the mode for displaying the list of content or apps in response to the command of the user, and makes a list of content items that are controllable by or optimized for the particular type of remote control device in accordance with the identification results. As used herein, "optimized for the particular type of remote control device" means that the content is suited for or designed for the particular type of remote control device. The term "optimized" does not necessarily signify "best" suited for in a superlative sense. The display apparatus groups the content according to the categories 307, 308, 309, and 310 and generates category tabs 307, 308, 309, and 310. In particular, the display apparatus may group only the content controllable by the identified remote control device type into one category. The category may be named after a name of the identified device type (e.g., "Apps for Exercise Bikes") or may be defined by a user. If a user selects a category, one or more icons of content that belong to the category may be displayed on the display. The display apparatus checks frequency that the content is selected, and determines the size of icon corresponding to the content in accordance with the frequency and/or age of the content. For example, the icons 302, 303, 304, and 305 corresponding to the content of a relatively low frequency (i.e., less frequently accessed than a threshold frequency value) are small, while the icon 301 corresponding to the content of a relatively high frequency (i.e., more frequency accessed than a threshold frequency value) is large. Further, an icon 306 of newly registered content may be also largely displayed. In addition, the display apparatus may emphasize an icon 301 corresponding to content of a relatively high frequency. In FIG. 3, the icon 301 corresponding to the content of a relatively high frequency is surrounded with a bold frame. The emphasis may be placed according to other methods as well, including, for example, changing a thickness, changing a color, etc.

Figure 4:
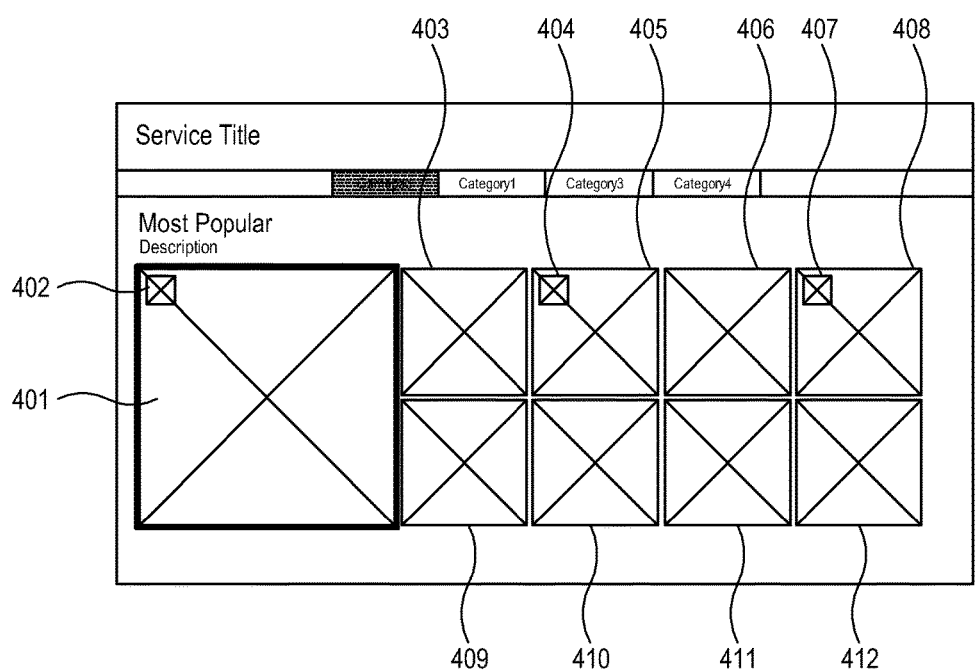

In FIG. 4, a list of content items 401, 403, 405, 406, 408, 409, 410, 411, and 412 is displayed on the display of the display apparatus. The list of content items 401, 403, 405, 406, 408, 409, 410, 411, and 412 may show icons corresponding to the apps. Each of the apps may be a program, a moving image, a still image, or a text. A user may select one piece of content in the list of a plurality of pieces of content and execute the selected one. At this time, the icon corresponding to the app selected by a user may be visually distinguished from the other icons. For example, the display apparatus may display the icon, which corresponds to the selected content, to be emphasized (highlighted) or altered in color or size, and thus distinguished from the other content.

The display apparatus receives data from the remote control device, and identifies the type of the remote control device based on the received data. The process of identifying the remote control device type by the display apparatus is equivalent to that described with reference to FIG. 3, and thus repetitive descriptions will be avoided.

If the remote control device is identified, the display apparatus may generate a list of content items controllable by the remote control device in accordance with the identification results. That is, the display apparatus can filter the controllable content based on data transmitted from the remote control device. The display apparatus may add graphical objects 402, 404, and 407 to the content controllable by the identified remote control device so as to display the controllable content distinguished from other non-controllable content.

For example the display apparatus displays the list of content items 401, 403, 405, 406, 408, 409, 410, 411, and 412 on the display, and add the graphic objects 402, 404, and 407 to the content items 401, 405, and 408 controllable by the identified remote control device.

Figure 5:
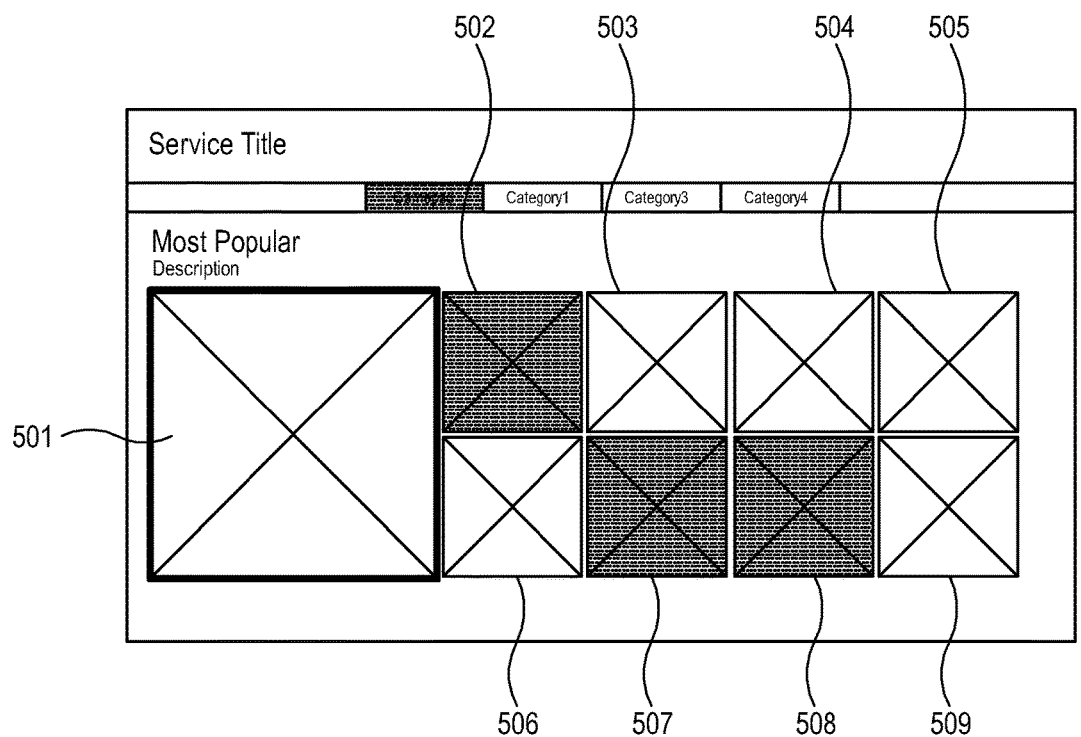

In FIG. 5, a list of content items 501, 502, 503, 504, 505, 506, 507, 508, and 509 is displayed on the display of the display apparatus. The list of content items 501, 502, 503, 504, 505, 506, 507, 508, and 509 may show icons corresponding to the apps. Each of the apps may be a program, a moving image, a still image, or a text. A user may select one piece of content in the list of a plurality of pieces of content 501, 502, 503, 504, 505, 506, 507, 508, and 509 and execute the selected one. At this time, the icon corresponding to the app selected by a user may be visually distinguished from the other icons, as discussed above. For example, the display apparatus may display the icon, which corresponds to the selected content, to be emphasized (highlighted) or changed in color or size, and thus distinguished from the other content.

The display apparatus receives data from the remote control device, and identifies the remote control device based on the received data. The process of identifying the remote control device by the display apparatus is equivalent to that described with reference to FIG. 3, and thus repetitive descriptions will be avoided.

If the remote control device is identified, the display apparatus may make a list of content controllable by the remote control device in accordance with the identification results. That is, the display apparatus can filter the controllable content based on data transmitted from the remote control device. The display apparatus may activate only the content controllable by the identified remote control device. For example the display apparatus displays the list of content items 501, 502, 503, 504, 505, 506, 507, 508 and 509 on the display, and activates the content 501, 503, 504, 505, 506 and 509 controllable by the identified remote control device. The display apparatus displays the content 502, 507, and 508, not controllable by the identified remote control device, deemphasized (e.g., with relatively low brightness), so that the corresponding content 502, 507, and 508 can be visually distinguished and/or deactivated.

Figure 6:
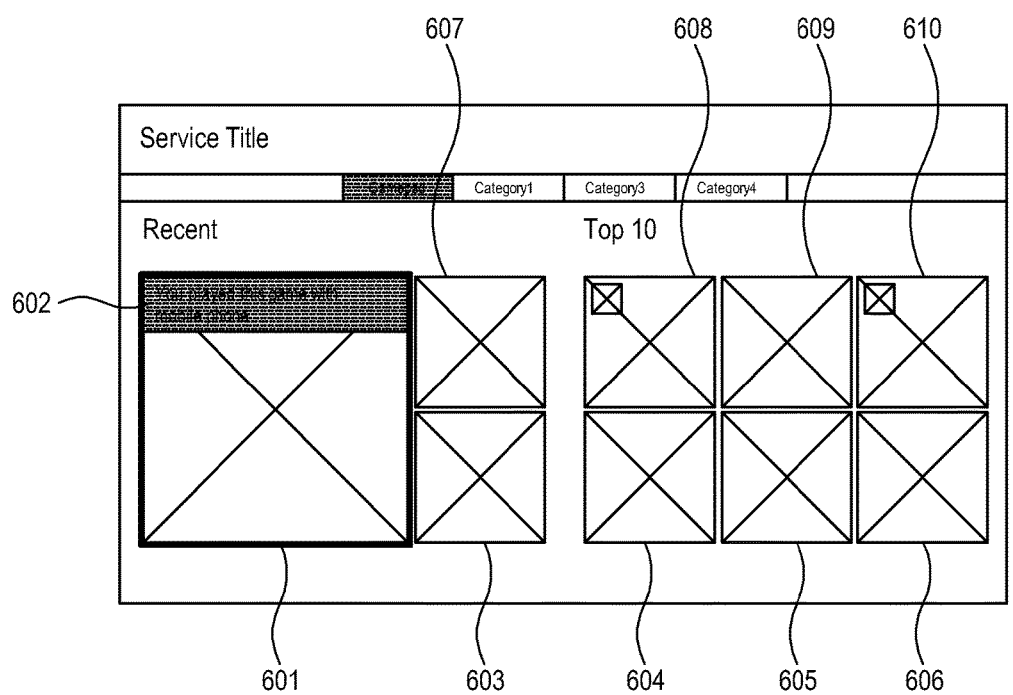

In FIG. 6, a list of content items 601, 603, 604, 605, 606, 607, 608, 609, and 610 is displayed on the display of the display apparatus. The list of content items 601, 603, 604, 605, 606, 607, 608, 609, and 610 may show icons corresponding to the apps. Each of the apps may be a program, a moving image, a still image, or a text. A user may select one piece of content in the list of a plurality of pieces of content 601, 603, 604, 605, 606, 607, 608, 609, and 610 and execute the selected one. At this time, the icon corresponding to the app selected by a user may be visually distinguished from the other icons. For example, the display apparatus may display the icon, which corresponds to the selected content, to be emphasized (highlighted) or changed in color or size, and thus distinguished from the other content.

The display apparatus receives data from the remote control device, and identifies the type of the remote control device based on the received data. The process of identifying the remote control device type by the display apparatus is equivalent to that described with reference to FIG. 3, and thus repetitive descriptions will be avoided.

If the remote control device is identified and previously executed content is executed again, the display apparatus may display a message when the remote control device previously used for executing the content is different from the currently identified remote control device. For example, if a user executes a game app 601 with a game controller, the display apparatus generates information about the game controller and stores the information in the storage. The storage may store information about the date and time of the execution of the game 601 and the type of remote control device used for controlling the game 601.

Then, if a user executes the same game 601 again, the display apparatus retrieves information about the remote control device previously used while executing the game 601 from the storage and determines whether the previous remote control device is of the same type as the currently identified remote control device. If the currently identified remote control device is different from the remote control device previously used in executing the game 601, the display apparatus may display a message 602 for informing that the currently identified remote control device is different from the remote control device previously used in executing the game 601. The message 602 may be displayed as an overlay on top of the content 601 or at a predetermined area.

Figure 7:
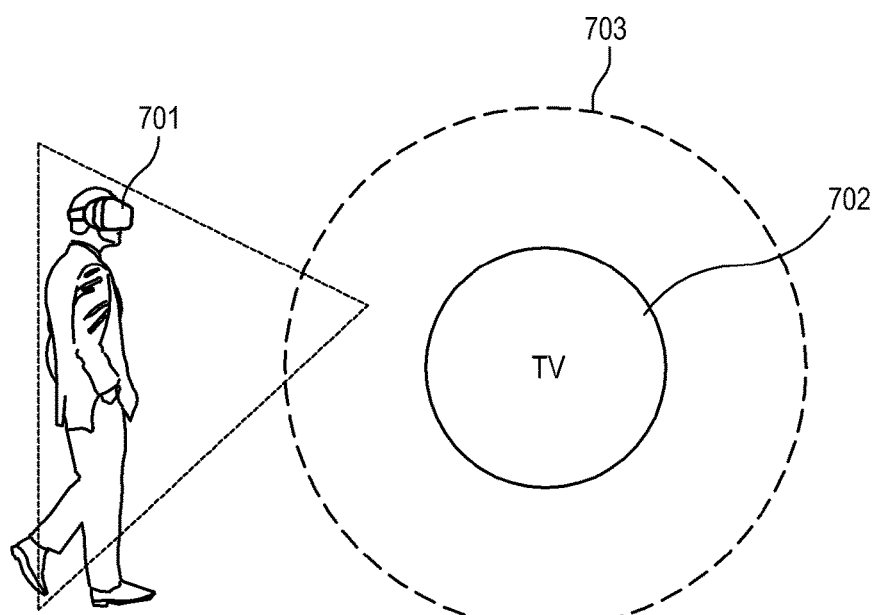
FIG. 7 illustrates an exemplary display apparatus automatically displaying a corresponding screen when the remote control device is within a predetermined distance from the display apparatus.

FIG. 7 illustrates an exemplary display apparatus 702 automatically displaying a corresponding screen when the remote control device 701 is within a predetermined distance 703 from the display apparatus 702.

In FIG. 7, if a user is within a predetermined distance 703 from the display apparatus 702 while carrying the remote control device 701 (e.g., a virtual reality device), the display apparatus 702 recognizes the approach of the remote control device 701 and displays a corresponding UI screen on the display. The display apparatus 702 uses the sensing portion 207 or the communicator 130 provided therein to sense the approach of the remote control device 701, thereby outputting a signal. The display apparatus 702 senses the approach of the remote control device 701, and displays a UI screen that corresponds to the virtual reality device 701 on the display of the display apparatus 702 based on the signal received through the sensing portion 207 or the communicator 130.

Further, the remote control device 701 may transmit ID information of the remote control device 701 to the display apparatus 702. The display apparatus 702 may receive the ID information from the remote control device 701, identify the remote control device 701, and display a corresponding UI screen on the display.

As the remote controller 701 comes within a predetermined distance from the display apparatus 702, the display apparatus 702 may send a request for the ID information to the remote control device 701, and the remote control device 701 may transmit the ID information to the display apparatus 702. Further, the remote control device 701 may periodically transmit the ID information to the display apparatus 702 or broadcast the ID information to and any other devices in the vicinity even when the display apparatus 702 does not make a request.

The display apparatus 702 identifies the remote control device based on the received ID information, and provides a UI screen suitable for the identified remote control device. For example if it is determined that the remote control device 701 is a virtual reality device, the display apparatus 702 may provide a list of content that is accessible to the remote control device 701 or controllable by the remote control device 701. The list may exclude other content that is inaccessible or uncontrollable by the remote control device 701.

Figure 8:
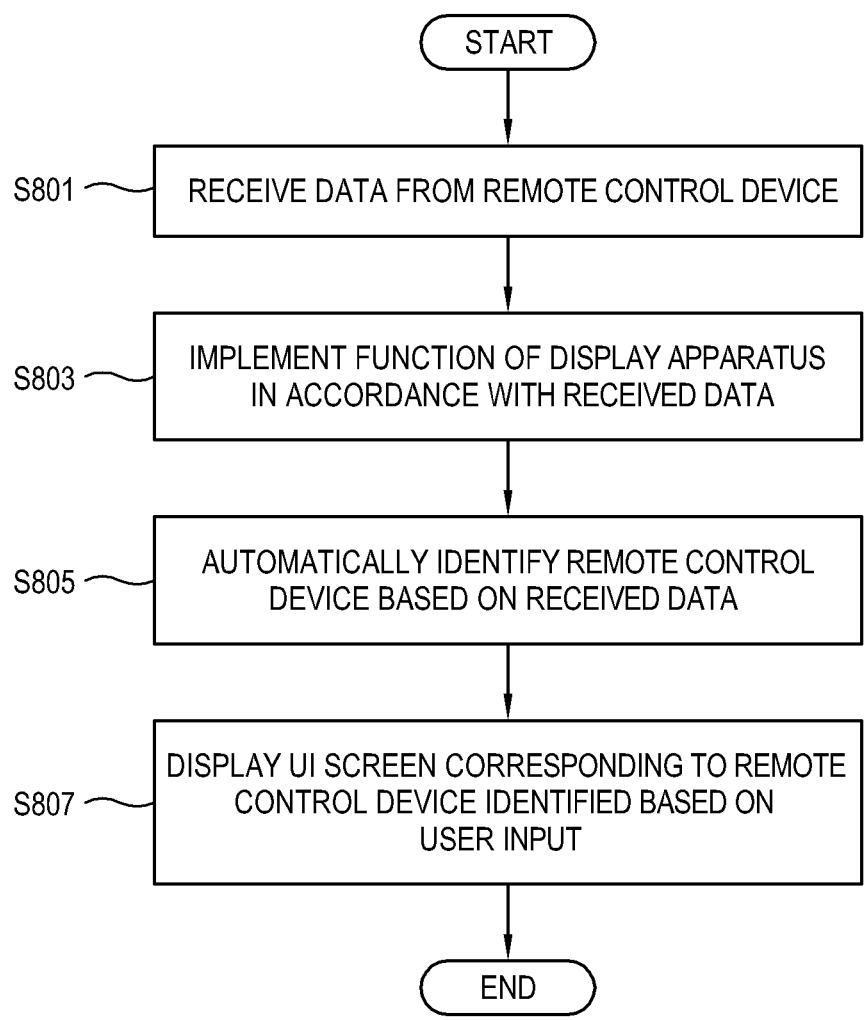
FIG. 8 is a flowchart for a display apparatus according to an exemplary embodiment providing a user interface (UI) screen corresponding to the identified remote control device.

FIG. 8 is a flowchart for a display apparatus according to an exemplary embodiment providing a user interface (UI) screen corresponding to the identified remote control device.

In FIG. 8, the display apparatus receives data from the remote control device (S801). The remote control device may be a remote control that can control the display apparatus within a relatively short range (e.g., in the same room). For example, the remote control device may be a television or set-top box remote control, a game controller, a wireless keyboard, a wireless mouse, a virtual reality device, or a smart phone, but the disclosure is not limited thereto. In addition, the remote control device may be a smart scale, a balance pad, or like electronic apparatus equipped with various sensors. The remote control devices may be different from one another in communication protocol for communicating with the display apparatus and transmitting data to the display apparatus. The display apparatus may perform its function in accordance with the received data (S803).

The display apparatus receives data from the remote control device, and controls its screen display in accordance with the received data. That is, the data may be a command for controlling the screen display of the display apparatus. For example, if a user presses a direction button provided in the IR remote controller, a cursor displayed on the display apparatus is moved in a corresponding direction (e.g., up, down, left, or right). If a user presses an "OK" button provided in the IR remote controller, an icon displayed at a position currently pointed by the cursor is selected. Further, the data may be a command for controlling the volume level of the display apparatus. For example, if a user presses a volume-up button provided in the IR remote controller, the display apparatus increases its volume level.

The display apparatus automatically identifies the remote control device based on the received data (S805). Here, "automatically" signifies that the identification is performed without the need of any extra user input with regard to the identification of the remote control device type. To identify the remote control device, the display apparatus may perform a function corresponding to the received data if the data is received from the remote control device, or perform learning to identify the remote control device. For example, if a user presses a direction button on the game controller to browse a website displayed on the display apparatus, the display apparatus may first analyze a communication protocol from the received data about the direction key of the game controller and determine that Bluetooth protocol is used for the received data in accordance with the analysis results. The display apparatus may analyze a key value of the received data, move a cursor or highlight displayed on the screen of the display apparatus up, down, left, or right in accordance with the key values, and identify the type of remote control device as a game controller based on the key value and the communication protocol. That is, the display apparatus implements a function in accordance with the received data, and identifies the remote control device based on the implemented function. Further, the display apparatus identifies the communication protocol of the received data, and identifies the remote control device based on the identified protocol.

If the remote control device is identified, the display apparatus displays a UI corresponding to the remote control device on the screen (S807). The UI screen may show a list of content items controllable by the identified remote control device type. For example, if the remote control device is identified while the list of content is being displayed on the display of the display apparatus, the display apparatus displays only those content items controllable by the identified remote control device on the display. Further, if the remote control device is identified, the display apparatus may display the content, which is controllable by the remote control device, to be visually distinguishable. For example, if the identified display apparatus is a game controller, the display apparatus may display an icon corresponding to game content controllable by the game controller to be bigger than, different in color from, or highlighted compared to other icons corresponding to non-controllable content.

The data transmitted by the remote control device may include the ID information of the remote control device. For example the IR remote controller may embed its own ID information to a leader pulse while transmitting the data. The display apparatus may analyze the ID information transmitted from the IR remote controller and determine the remote control device and the IR remote controller.

Once the remote control device is identified, the display apparatus may receive a user's command for executing one piece of the content in the list of content displayed on the display. The display apparatus may display a first message on the screen if the content selected by a user is not controllable by the identified device. If a user selects one piece of the content among the plurality of pieces of content displayed on the display, the display apparatus can determine whether the selected content is controllable by the identified device. If the selected content is controllable by the identified device, the display apparatus executes the selected content. On the other hand, if the selected content is not controllable by the identified device, the display apparatus displays a message informing the user that the currently selected content is not controllable by the identified remote control device. In addition, if there is a usage history indicating that the same content has been used by a user, the display apparatus may display a message showing the names of the previously used remote control devices. That is, the display apparatus may display a message showing the names of the remote control devices capable of controlling the content.

Further, if the remote control device is identified, the display apparatus creates a category for the content controllable by the identified remote control device, and displays the category on the display. Further, the display apparatus senses the approach of the remote control device, identifies the remote control device based on the sensing results, and displays a UI screen corresponding to the identified remote control device. Here, the UI screen may be at least one piece of the content controllable by the identified remote control device. Further, the UI screen may be a screen where control buttons are arranged to be controllable by the identified remote control device.

FIG. 9 is a flowchart for a display apparatus according to another exemplary embodiment providing a UI screen corresponding to an identified remote control device.

As illustrated in FIG. 9, the display apparatus senses an approach of the remote control device and sends a request for ID information to the remote control device (S901). For example, the remote control device may be a television or set-top remote control, a game controller, a wireless keyboard, a wireless mouse, a virtual reality device, or a smart phone, but the disclosure is not limited thereto. The remote control device may also be a smart scale, a balance pad, or like electronic apparatus equipped with various sensors. The remote control devices are different from one another in communication protocol for communicating with the display apparatus and transmitting data to the display apparatus. The display apparatus may receive information for identifying the remote control device from the remote control device (S903).

The data transmitted from the remote control device may include the ID information of the remote control device. For example, the remote controller may transmit ID information corresponding to the remote controller to the display apparatus. The game controller may transmit the ID information corresponding to the game controller to the display apparatus. The keyboard may transmit the ID information corresponding to the keyboard to the display apparatus. The exercise bicycle may transmit the ID information corresponding to the exercise bicycle to the display apparatus. The wearable device may transmit the ID information corresponding to the wearable device to the display apparatus. The ID information, which is information for identifying the type of the unique identity of the remote control device on a network, may be assigned by a user or assigned when the device is manufactured. The ID information may include a media access control (MAC) address or a device type identifier.

The display apparatus may identify the remote control device based on the ID information of the remote control device (S905). To identify the remote control device, the display apparatus may receive the ID information for identifying the remote control device from the remote control device and thus identify the remote control device based on the ID information.

If the remote control device is identified, the display apparatus displays a UI corresponding to the identified remote control device on the screen based on a user input (S907). The user input may be a command for entering a content list mode (i.e., accessing a menu that lists available content items). The display apparatus may display a UI corresponding to the remote control device on the screen in response to a user's command for entering the content list mode.

For example, if a user approaches the display apparatus while carrying the remote controller, the display apparatus sends a request for ID information to the remote controller, and identifies the remote controller based on the ID information received from the remote controller. If a user issues a command for entering the content list mode in the remote controller, the display apparatus displays a UI corresponding to the remote controller on the screen. Here, the UI screen may, for example, show a list of broadcast programs.

For example, if a user approaches the display apparatus while carrying a game controller, the display apparatus may send a request for the ID information to the game controller and identify the game controller based on the ID information received from the game pad. If a user issues a command for displaying a list of game apps by using the game controller, the display apparatus displays a UI corresponding to the game controller on the screen. The UI screen may, for example, show a list of games controllable by the game controller.

For example, if a user approaches the display apparatus while carrying the keyboard, the display apparatus makes a request for the ID information to the keyboard and identifies the keyboard based on the ID information received from the keyboard. If a user issues a command for displaying a list of content in the keyboard, the display apparatus displays a UI corresponding to the keyboard on the screen. The UI screen may, for example, show a list of content controllable by the keyboard.

Although a few exemplary embodiments and drawings have been shown and described, it will be appreciated by those skilled in the art that various modifications and changes may be made in these exemplary embodiments without departing from the principles and spirit of the invention. The operations according to the foregoing exemplary embodiments may be performed by a single processor. In this case, a program command for performing the operations to be implemented by various computers may be recorded in a computer-readable medium. The computer-readable medium may contain a program command, a data file, a data structure, etc. or any combination thereof. The program command may be specially designed and made for the foregoing embodiments, or publicly known and available to those skilled in the art. As an example, the computer-readable medium may be a magnetic medium, such as a hard disk drive, a floppy disk, a magnetic tape, etc.; an optical medium, such as a compact disc read-only memory (CD-ROM), a digital versatile disc (DVD); a magnetic-optical medium, such as a floptical disk; or a hardware device, such as a read-only memory (ROM), a random access memory (RAM), a flash memory, etc. specially configured to store and execute a program command. The program command may be machine code generated by a compiler or high-level language code to be executable by a computer through an interpreter or the like. If a base station or relay described in this exemplary embodiment is fully or partially achieved by a computer program, the computer readable-medium storing the computer program may also belong to the present inventive concept. Therefore, the foregoing has to be considered as being illustrative only.

What is claimed is:

1. A method of controlling a display apparatus, the method comprising:
   displaying a plurality of content items on a screen of the display apparatus;
   receiving data from a connected remote control device;
   identifying a device type of the connected remote control device based on the received data; and
   displaying on the screen of the display apparatus a list of content items controllable by the connected remote control device based on the identified device type of the connected remote control device,
   wherein the displaying the list of content items comprises displaying at least one of the plurality of content items corresponding to the identified device type of the connected remote control device among the plurality of content items distinguishably from remaining content items of the plurality of content items.

2. The method according to claim 1, wherein the connected remote control device is identified further based on a function of the display apparatus.

3. The method according to claim 1, wherein the device type of the connected remote control device is at least one of an infrared (IR) remote control, a smartphone, a game controller, a keyboard, an exercise bicycle, and a wearable device.

4. The method according to claim 1, wherein the data comprises a command for moving a cursor displayed on the screen of the display apparatus.

5. The method according to claim 1, wherein the data comprises a command for controlling a volume level of the display apparatus.

6. The method according to claim 1, wherein the list of content items is displayed on a user interface (UI).

7. The method according to claim 1, wherein the list of content items is optimized for the identified device type of the connected remote control device.

8. The method according to claim 1, wherein the displaying the at least one of the plurality of content items comprises grouping the at least one of the plurality of content items into a category to be distinguished from the remaining content items.

9. The method according to claim 1, wherein the displaying the at least one of the plurality of content items comprises adding a graphical object to the at least one of the plurality of content items.

10. The method according to claim 1, wherein the data comprises identification information of the connected remote control device.

11. The method according to claim 1, further comprising:
    receiving a user command for executing a selected content item included in the list of content items; and
    displaying a message, indicating at least one remote control device capable of controlling the selected content item, on the screen of the display apparatus in response to a determination that the selected content item is not controllable by the identified device type of the connected remote control device.

12. The method according to claim 3, wherein the identifying the device type of the connected remote control device comprises identifying a communication protocol of the received data, and identifying the device type of the connected remote control device based on the communication protocol.

13. The method according to claim 6, wherein the displaying the list of content items comprises displaying an icon corresponding to a content item of the list of content items to be different, from other icons, in size in accordance with a frequency with which the content item is selected by a user.

14. A method of controlling a display apparatus, the method comprising:
    sensing a remote control device located within a threshold distance from the display apparatus;
    in response to the sensing the remote control device, sending a request for identification information of the remote control device;
    receiving the identification information from the remote control device;
    identifying a device type of the remote control device based on the identification information received from the remote control device; and
    displaying a list of content items controllable by the remote control device based on the identified device type of the remote control device,
    wherein the displaying the list of content items comprises displaying at least one of a plurality of content items corresponding to the identified device type of the remote control device among the plurality of content items distinguishably from remaining content items of the plurality of content items.

15. A display apparatus comprising:
    a display;
    a communicator configured to receive data from a remote control device; and
    a controller configured to identify a device type of the remote control device based on the received data and control the display to display, on the display, a list of content items controllable by the remote control device based on the identified device type of the remote control device,
    wherein the controller is further configured to display the list of content items by displaying at least one of a plurality of content items corresponding to the identified device type of the remote control device among the plurality of content items distinguishably from remaining content items of the plurality of content items.

16. The display apparatus according to claim 15, wherein the controller is configured to implement a function corresponding to a key value of the received data and identify the remote control device based on the implemented function.

17. The display apparatus according to claim 15, wherein the data comprises a command for controlling the display of the display apparatus.

18. The display apparatus according to claim 15, wherein the data comprises a command for controlling a volume level of the display apparatus.

19. The display apparatus according to claim 15, wherein the controller identifies a communication protocol of the received data, and identifies the remote control device based on the communication protocol.

* * * * *